(12) United States Patent
Weyer et al.

(10) Patent No.: US 10,020,012 B1
(45) Date of Patent: Jul. 10, 2018

(54) DATA STORAGE DRIVE WITH LOW-LATENCY PORTS COUPLING MULTIPLE SERVO CONTROL PROCESSORS

(71) Applicant: Seagate Technology LLC, Cupertino, CA (US)

(72) Inventors: Aaron P. Weyer, Shakopee, MN (US); Bruce Douglas Buch, Westborough, MA (US); Kyaw Sin Maung, Bloomington, MN (US); Jon D. Trantham, Chanhassen, MN (US); Nicholas Paul Mati, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/798,541

(22) Filed: Oct. 31, 2017

(51) Int. Cl.
*G11B 5/09* (2006.01)
*G11B 5/55* (2006.01)
*G11B 5/596* (2006.01)
*G06F 13/42* (2006.01)

(52) U.S. Cl.
CPC ............ *G11B 5/5526* (2013.01); *G06F 13/42* (2013.01); *G11B 5/59616* (2013.01)

(58) Field of Classification Search
CPC . G11B 20/10009; G11B 5/09; G11B 2220/90; G11B 20/10212; G11B 5/012; G11B 20/1403
USPC ................................. 360/51, 55, 39, 46, 45
See application file for complete search history.

(56) References Cited

U.S. PATENT DOCUMENTS

| | | | |
|---|---|---|---|
| 4,807,116 A | 2/1989 | Katzman et al. | |
| 6,415,349 B1 * | 7/2002 | Hull | G11B 20/10009 360/39 |
| 8,090,906 B1 | 1/2012 | Blaha et al. | |
| 2004/0193743 A1 | 9/2004 | Byers et al. | |
| 2008/0005749 A1 | 1/2008 | Mead et al. | |

* cited by examiner

*Primary Examiner* — Nabil Hindi
(74) *Attorney, Agent, or Firm* — Hollingsworth Davis, LLC

(57) ABSTRACT

First and second servo control processors are coupled to respective first and second actuators that independently position first and second heads over one or more disks of a data storage drive. The first and second servo control processors are further coupled to first and second low-latency ports. First and second unidirectional buses couple the first and second low-latency ports. The first and second unidirectional busses are operable to isochronously exchange servo positioning data between the first and second servo control processors. The first and second servo control processors each use the servo positioning data to compensate for movement caused by another of the first and second servo control processors.

20 Claims, 7 Drawing Sheets

---

Move a first head via a first servo control processor that drives a first actuator — 1600

Isochronously communicate first data describing the moving of the first head to a second servo control processor via a first bus — 1601

Compensate for the moving of the first head when moving a second head via a second servo control processor — 1602

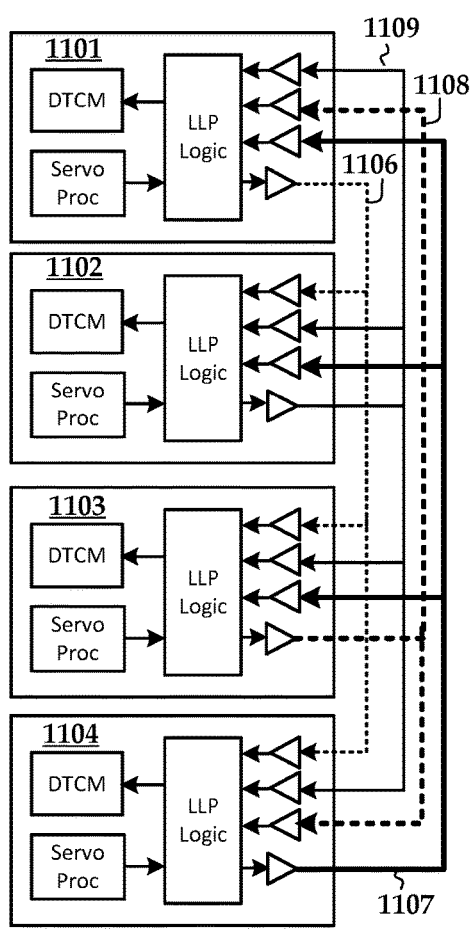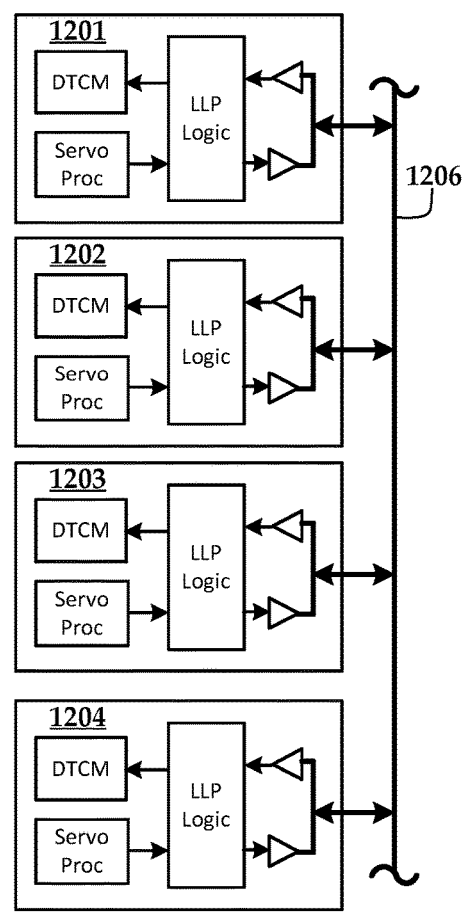
*FIG. 11*  *FIG. 12*

DATA STORAGE DRIVE WITH LOW-LATENCY PORTS COUPLING MULTIPLE SERVO CONTROL PROCESSORS

SUMMARY

The present disclosure is directed to a data storage device with low-latency ports coupled multiple servo control processors. In one embodiment, first and second servo control processors are coupled to respective first and second actuators that independently position first and second heads over one or more disks of a data storage drive. The first and second servo control processors are further coupled to first and second low-latency ports. First and second unidirectional buses couple the first and second low-latency ports. The first and second unidirectional busses are operable to isochronously exchange servo positioning data between the first and second servo control processors. The first and second servo control processors each use the servo positioning data to compensate for movement caused by another of the first and second servo control processors.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 11 is a block diagram illustrating a one-to-many simplex topology according to an example embodiment;

FIG. 12 is a block diagram illustrating a shared bus topology according to an example embodiment;

DETAILED DESCRIPTION

Figure 1:
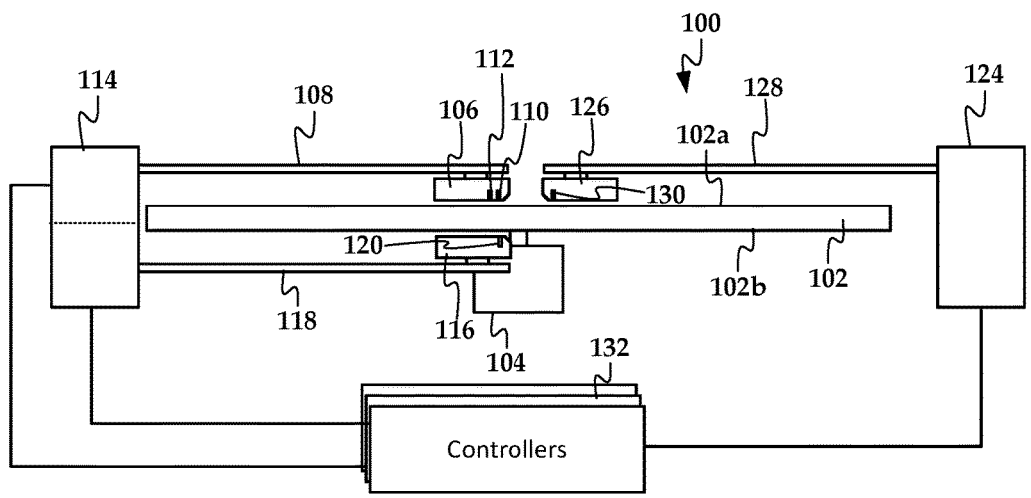
FIG. 1 is a diagram of an apparatus according to an example embodiment.

The present disclosure generally relates to data storage devices that utilize magnetic storage media, e.g., hard disk drives (HDDs). Additional HDD features described herein, generally described as "parallelism" architectures are seen as a way to increase HDD performance measures such as IOPS and latency. Generally, parallelism architectures utilize multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for random data access requests. In different embodiments, using two heads simultaneously involves operating two actuators (e.g., voice coil motors) at the same time as well.

The simultaneous seek capability of a multiple actuator disk drive is not without technical implementation challenges. There are various different mechanical approaches to multiple actuators, such as two actuators collocated on a common pivot axis, or two actuators located apart (e.g., opposed) on different pivots. Regardless of which mechanical approach is taken, seek performance can be affected by the rotational vibration interactions between actuators. When an actuator is accelerated and decelerated, it imparts equal and opposite forces on the drive enclosure. These forces are felt by the other actuators in the system and are compensated for during their tracking and seeking by a servo control system.

It is easier and more effective to compensate for inter-actuator vibration effects if they are known about in advance of the event. For example, if a particular command causes a first actuator to begin moving in a particular direction, the timing and magnitude of the forces felt by a second actuator can be predicted and used as an input to the second actuator's servo controller. Thus the drive can be configured to communicate between servo systems so that they are aware of each other's activity. If both servo systems are within a single controller (e.g., application specific integrated circuit, or ASIC), this can be done via inter-processor communication. For cost and power-density reasons, more than one controller ASIC may be used to operate the servo control systems of different actuators. This involves configuring the ASICs for real-time, dependable communication between ASICs. The communication is two-way and isochronous, so that each servo system receives the other's information consistently.

In this context, the term "isochronous" indicates that the ASICs exchange messages at regular intervals. The intervals may be servo-to-servo timing interval or sub-multiples thereof, since the disturbances that this messaging endeavors to counteract in real-time occurs at servo intervals. This isochrony drives the need for low latency, since a relaxed latency feature like queuing, store-and-forwarding, would result in isochronously-issued messages from the sender arriving at the receiver at not-so-isochronous intervals, which could compromise effectiveness.

Embodiments described below provide high-speed, real-time, isochronous communication between two or more controller ASICs for the purpose of communicating servo system information between controllers. For example, the ASICs may include a low-latency port (LLP) interface with two unidirectional 4-bit buses and a source-synchronous dual-data rate clock in each direction between 2 ASICs. This allows the servo system of each ASIC to asynchronously push information in the form of message packets into the servo processor memory of the other ASIC without any bus arbitration delay, thus providing the low-latency communication attributes suitable for inter-servo messaging.

In FIG. 1, a diagram illustrates an apparatus 100 with parallelism features according to example embodiments. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk

102. The actuator 114 may include a voice coil motor (VCM) that rotates in response to an electrical current, although embodiments described herein may be applicable to other tracking actuators, e.g., linear actuators, piezoelectric microactuators, etc.

In one embodiment, the slider includes a read transducer 110 and/or a write transducer 112. The read transducer 110 provides a signal in response to changing magnetic fields on the disk 102, and is coupled to a controller (not shown), where the separate read signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102*b* of the disk 102 and actuator 114 causes the second arm 118 to move to different tracks on the disk 102. The arm 118 may move together with arm 108, or the arms 108, 118 may move independently (as indicated by dashed line on actuator 114 indicating a split VCM actuator). In either configuration, the arms 108, 118 rotate around the same axis. The slider 116 also includes read and/or write transducers 120. The transducers 120 are capable of reading from and/or writing to disk surface 102*b* simultaneously with one or both of read/write transducers 110, 112 that access disk surface 102*a*.

In another embodiment, the apparatus 100 includes a third slider 126 supported by a third arm 128. The third slider 126 (and its associated actuation hardware) may be included instead of or in addition to the second slider 116. The third slider 126 is held over the first surface 102*a* of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading from and/or writing to disk surface 102*a* simultaneously with transducers 110, 112 of first slider 106.

In the examples shown in FIG. 1, more than one disk 102 may be used, and the actuators 114, 124 may be coupled to additional heads that access some or all of the additional disk surfaces. In this context, "accessing" generally refers to activating a read or write transducer and coupling the transducer to a read/write channel. Independently movable heads that utilize a split actuator 114 may generally simultaneously access different surfaces, e.g., heads 106 and 116 access different surfaces 102*a*, 102*b* at the same time. Independently movable heads that utilize non-coaxial actuators 114, 124 may access the same surface at the same time, e.g., heads 106 and 126 may both access surface 102*a* at the same time, as well as accessing different surfaces at the same time.

Two or more controllers 132 are coupled to the respective actuators 114, 124 and control movement of the actuators 114, 124. The controllers 132 may include ASICs or systems-on-a-chip (SoCs) that perform parallel operations such as servo control, encoding and decoding of data written to and read from the disk 102, queuing and formatting host commands, etc. The controllers 132 may have identical hardware (e.g., formed from the same semiconductor die or dies), although they may be configured to perform differently, e.g., due to different firmware and/or software instructions that are executed at start up.

In any of the mechanical approaches illustrated in FIG. 1, one effect of having independently operating actuators is the rotational vibration interaction between actuators. When an actuator is accelerated and decelerated, it imparts equal and opposite forces on the drive enclosure. These forces are felt by the other actuators in the system. If not compensated for during tracking and seeking, these reaction forces can reduce performance of the other actuators, e.g., increase settling times, cause mistracking, result in undershooting or overshooting a target track, etc.

It is easier to compensate for these actuator-induced effects if they are known about in advance of and/or contemporaneously with the event causing the effect. To that end, independent servo systems can be configured to communicate with one another so that they are aware of each other's activity. If both servo systems are within a single ASIC, this can be done via inter-process communications, e.g., shared memory, pipes, sockets. For cost and power-density reasons, it may be preferable to use more than one controller ASIC. In such a case, two or more ASICs should be configured for real-time, dependable communication therebetween. By making the communication isochronous, each servo system can receive the other's information consistently, e.g., such that the effects can be compensated for in a timely and predictable manner.

Figure 2:
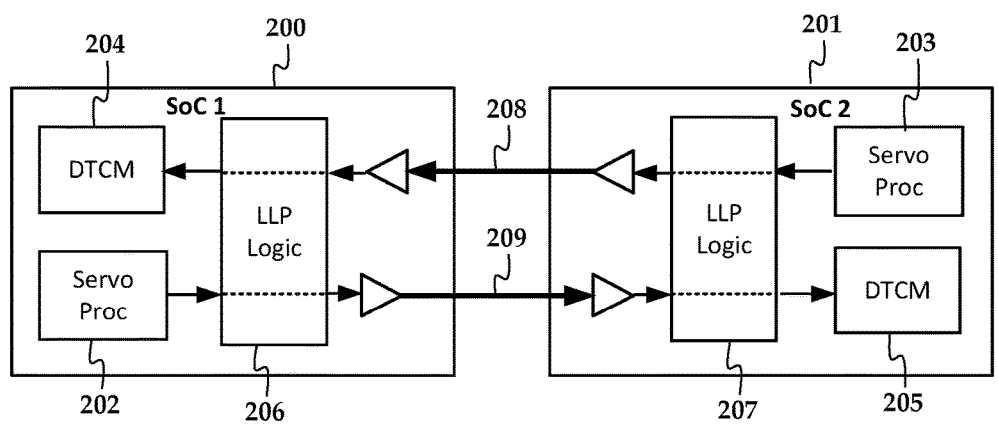
FIG. 2 is a block diagram of a system according to an example embodiment.

The systems and methods described herein provide high-speed, real-time, isochronous communication between two or more controller ASICs for the purpose of communicating servo system information between controllers. In FIG. 2, a block diagram illustrates aspects of a system according to an example embodiment. Two SoCs 200, 201 each include servo control processors 202, 203. The servo processors 202, 203 may be discrete logic circuits, e.g., ASICs, or may be processes running on a central microcontroller. The SoCs 200, 201 also each include respective tightly-coupled data memory (DTCM) 204, 205 that are associated with the servo processors 202, 203. A processor's tightly-coupled memory is memory it can access with minimal and consistent latency, e.g., zero wait states with no unpredictable stalls for operations like cache fills or flushes.

The SoCs 200, 201 communicate via respective low-latency port (LLP) interfaces 206, 207 each coupled to two, unidirectional 4-bit buses 208, 209 and a source-synchronous dual-data rate clock (not shown) in each direction. This allows the servo system of each SoC 200, 201 to asynchronously push information in the form of message packets into the servo processor memory of the other SoC without any bus arbitration delay, thus providing the low-latency communication attributes of inter-servo messaging.

The attributes of the LLP 206, 207 are targeted for the particular nature of inter-servo communication. For example, most information is sent at servo sample rate intervals (10's to 100's of KHz). Information sent at these intervals is only a few bytes. Due to its real-time criticality, information is sent with minimal latency. Although the average information bandwidth is low (e.g., a few bytes per servo sample interval), the need for low latency can be met by sending the information very fast, thus clocked at frequencies that are orders of magnitude (e.g., 10×, 100×, 1000×) higher than a maximum of the servo sample rates (e.g. LLP clocked to 10's to 100's of MHz). This combination of high bus clock speed and small message size results in a low duty cycle of bus utilization.

Continuously clocking the LLP buses 208, 209 for a low duty cycle usage could waste power, so in one embodiment the LLP logic 206, 207 implements "burst clocking" where an LLP clock only toggles when information is sent on the corresponding bus, and is at a fixed clock state otherwise (e.g., held low). For pin count economization, the LLP may include no explicit signal to frame LLP messages, nor use data-enable signals. All messages start with a command field that indicates the type of command and the length of the LLP message, and once a transfer has started, the receive state machine expects a continuous stream of the expected length containing command, payload data and ECC parity fields until the message is complete.

Because the receiver should have a reliable indication of length when a message begins, the command field that starts a message (e.g., a 16-bit field) indicating its length has its own error correction code (ECC) parity, providing single-error correction and double-error detection (SECDED) of errors in the command field. This is in addition to the ECC parity providing SECDED protection of the entire message content appended to the end of messages. Because all LLP messages are multiples of 8-bit bytes, the dual-data rate clocking of 4b units results in the clock always being low in the gap between messages. Generally, this means that messages sent via the LLP buses are multiples of a twice a bit width of the buses, thereby resulting in low clock after transmitting the last bit.

Message framing relies on receivers correctly interpreting the command field to discern message length and synchronization of state between the two ports. Errors that cause misinterpretation of the command field, or disrupt the assumed port state can result in mis-framing of subsequent received messages. This can be inferred from the resulting failure of message ECC checks, but requires means for re-establishing a mutually-understood state of framing between the LLP ports of both SOCs. This is executed with an initialization handshake described below.

Figure 3:
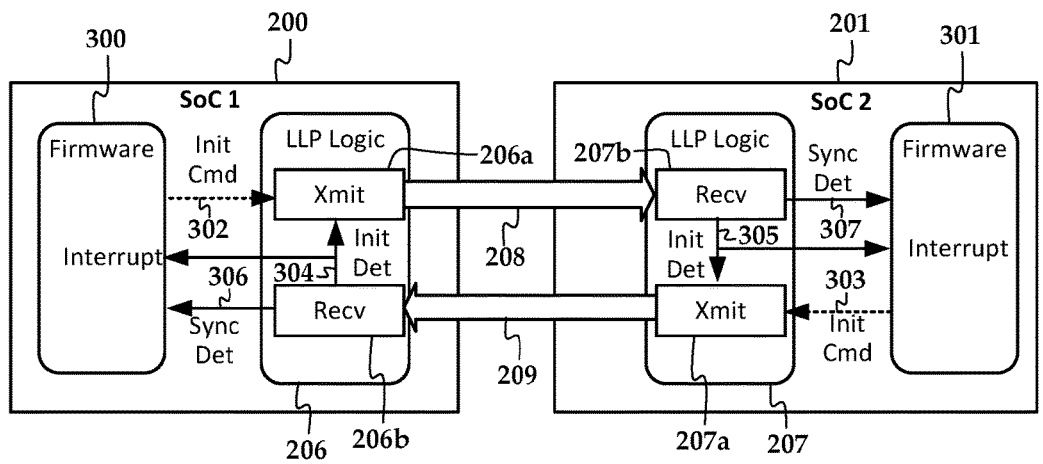
FIG. 3 is a block diagram of a system showing initialization signals according to an example embodiment.

In FIG. 3, a block diagram shows an example of initialization signals being used by a dual-SoC arrangement as in FIG. 2. The initialization handshake is executed whenever a need arises to synchronize the two LLP nodes 206, 207, as in the case of error recovery, and when booting up from reset. The initialization sequence uses in-band symbols that won't be interpreted as the first byte of a normal LLP command. A "symbol" is an 8-bit value sent with one pulse of the LLP clock. For the 4-bit buses 208, 209, this involves four bits being clocked by a positive clock transition followed by four bits clocked by the corresponding negative transition.

The initialization protocol is symmetric, in that it is independent of which SoC 200, 201 starts the initialization sequence. In this example, firmware 300, 301 of the respective SoC 200, 201 may send an initialization command 302, 303 to transmit logic section 206a, 207a of the LLP interface 206, 207. Receiver logic 206b, 207b of each LLP interface 206, 207 detects the start of the initialization sequence via the respective bus 208, 209, and the responses 304-307 to an initialization sequence, sent from the other SoC 201, 200.

Figure 4:
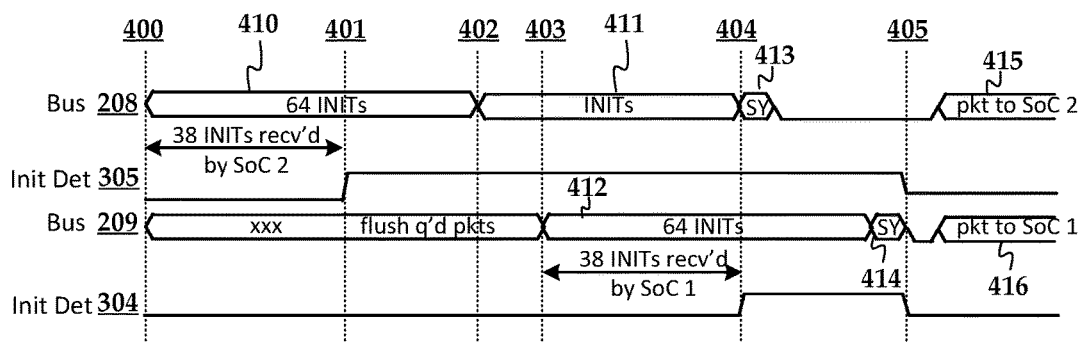
FIG. 4 is a timing diagram showing initialization signals according to an example embodiment.

In FIG. 4, a timing diagram illustrates details of the initialization protocol according to an example embodiment. At time 400, SoC 200 (also referred to as SoC 1 in this figure) begins the sequence by sending (via transmitter 206a via bus 208) a contiguous string 410 of 64 INIT symbols. The INIT symbol has a unique LLP command encoding and will not be interpreted as the first byte of a new 2-byte command (e.g., 11-bit command and 5-bit ECC parity). The significance of the 64-symbol length of string 410 is that this sequence is longer than the maximum normal LLP message length, so even if an LLP receiver was in a confused state with a corrupted message length and framing count, the current operation would complete (albeit potentially with errors) and the receiver would still see a sufficiently long, contiguous string of INITs to detect the start of an initialization sequence.

At time 401, the receiver 207b in SoC 201 (also referred to as SoC 2 in this figure) detects a contiguous string of at least 38 INIT bytes, and declares that SoC 1 has evoked an initialization sequence. The detection of these bytes causes the SoC 2 transmit path (bus 209) to start flushing any queued messages in preparation for sending a response to acknowledge the initialization sequence. At time 402, SoC 1 has finished sending the minimum 64 INIT symbols, but continues sending INITs (string 411) while waiting for the response from SoC 2.

At time 403, after SoC 2's transmit pipe 209 is flushed, SoC 2 firmware 301 starts the same initialization sequence by sending a contiguous string 412 of 64 INIT symbols. At time 404, when the SoC 1 receiver detects a contiguous string of at least 38 INIT symbols, SoC 1 knows that SoC 2 is acknowledging the initialization request, and sends a SYNC symbol 413 to let SoC 2 know that its acknowledgement was recognized and to indicate that SoC 1 is now ready for normal message exchange. At time 405, SoC 2 has detected the SYNC 413 sent from SoC 1, and so SoC 2 also sends a SYNC symbol to SoC 1, indicating that SoC 2 is also now ready for normal message exchange. The initialization sequence is complete at time 405, and messages 415 and 416 are transmitted thereafter. It should be noted that the above procedure may be extended to more than two SoCs. For example, the actions shown by SoC 2 could be repeated by additional SoCs to at least ensure synchronization between SoC 1 and those other SoCs.

Figure 5:
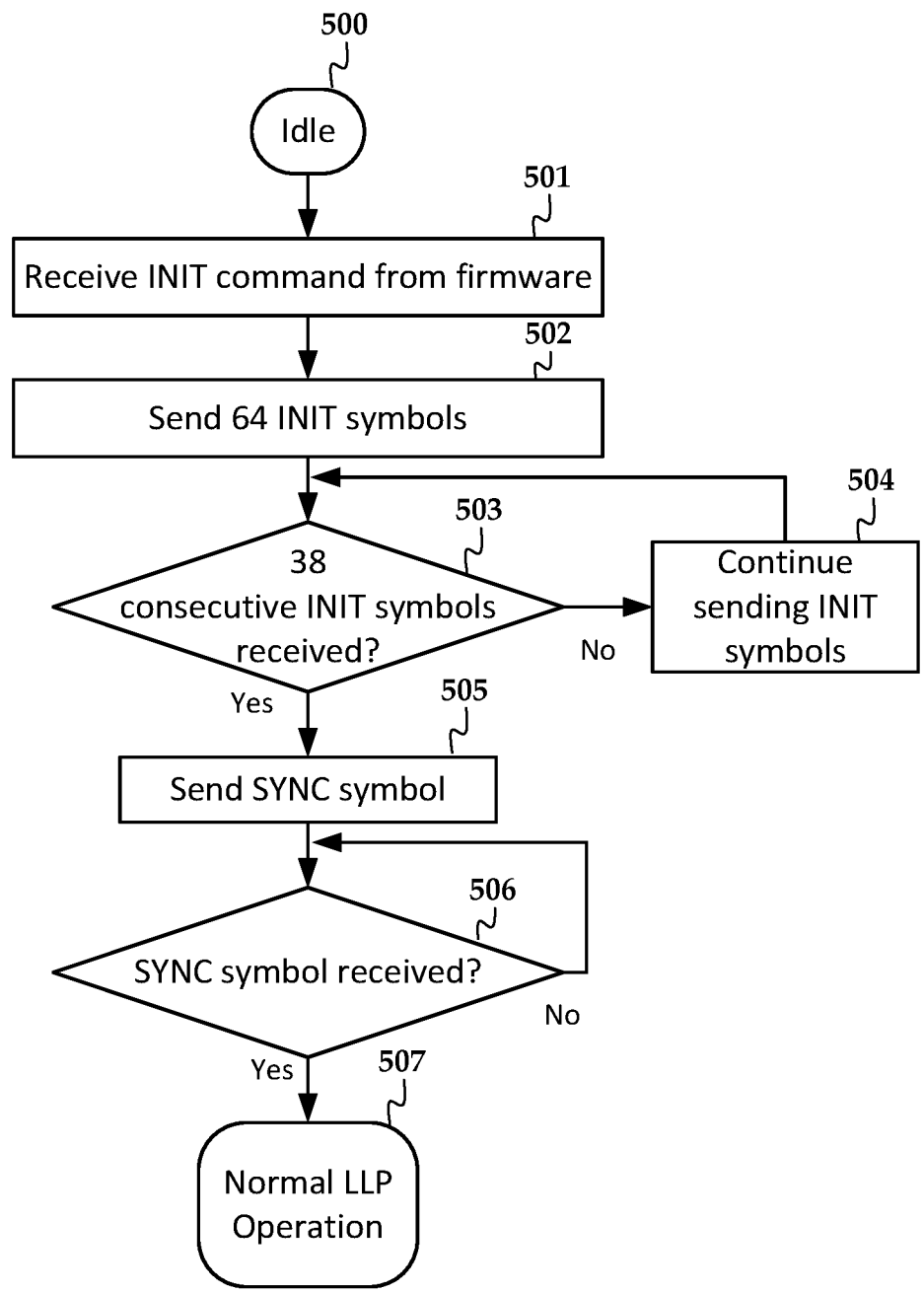
FIG. 5 is a flowchart showing an initialization process according to an example embodiment.

In FIG. 5, a flowchart shows an example of LLP logic initialization for an individual SoC according to an example embodiment. This example begins with the LLP logic in an idle state 500, although may begin from some other state, e.g., normal operation, completion of power on or reset, error state, etc. An INIT command is received 501 from the firmware. In response, an initialization sequence 502 is transmitted to another SoC. As in previous examples, the initialization sequence is 64 INIT symbols, although shorter or longer sequences could be used. As indicated by blocks 503 and 504, the SoC continues sending INIT symbols until it receives 38 consecutive INIT symbols from the other SoC.

Once the 38 consecutive INIT symbols are received from the other SoC, the SoC sends 505 a SYNC to acknowledge the receipt of the other SoC's INIT string and to indicate that this SoC is now ready to receive commands. Block 506 represents a wait state in which the SoC waits for the other SoC to send a SYNC symbol, thereby indicating the other SoC is also ready to receive commands. At block 507, the LLP is initialized and the command exchanges between the SoCs may now commence.

In FIGS. 6-10, timing diagrams show bus messaging operations with different-sized messages according to example embodiments. Each of the blocks in FIGS. 6-10 represent an LLP Data [3:0] symbol each comprising 4-bits of information driven onto the LLP bus by the transmitter. The transmitter clock is shown below each series of symbols. The index numbering 0, 1, 2, . . . within the blocks indicates the sequential position of the cell and not the actual value that is transmitted. Because each symbol in this example is a four-bit symbol, the values will range from 0 to 16 (0x0 to 0xF). The dark shading represents command symbols, the hatched shading indicates checksum parity, and no shading indicates message payload.

Figure 6:
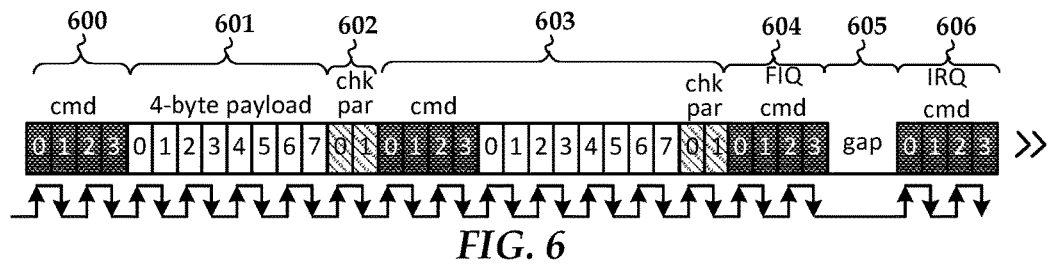
FIGS. 6, 7, 8, 9, and 10 are timing diagrams showing bus messaging operations according to example embodiments.

The sequence in FIG. 6 represents a series of 4-byte message transfers. The series begins with message that has three parts 600-602. The message begins with 16-bit command 600 that encodes data indicating at least a size of the message payload, and possibly other information (e.g., type of message, priority, etc.). In other embodiments, there may be a fixed relationship between some types of messages and message length, such that the command 600 need not define the payload size. The 4-byte transfer 601 is the payload for the message, which is followed by the 8-bit parity check 602. The next message 603 is also a 4-byte payload transfer, except that the command is encoded to generate an interrupt at the destination upon completion (no timing difference on the LLP Bus). These two transfers illustrate that any two commands can run back-to-back on the bus (e.g., with no intervening bits, clock cycles, etc. between adjacent commands). The third issued command 604 generates a FIQ interrupt at the destination upon reception. It is issued without a pause/gap in the clock, and does not contain a message payload. After a clock gap 605, a final 606 interrupt is issued which triggers an interrupt at the other SoC after reception. In this example, the LLP clock is low during the message gap 605.

Figure 7:
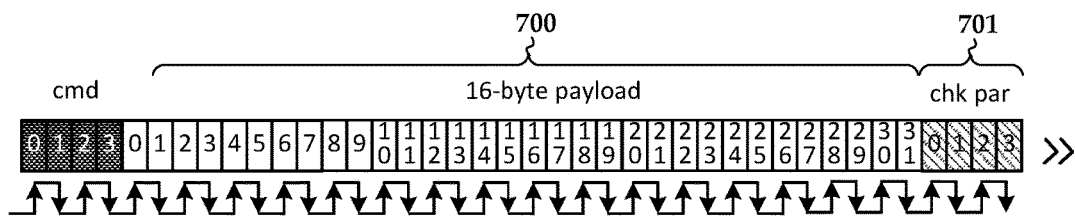
Figure 8:
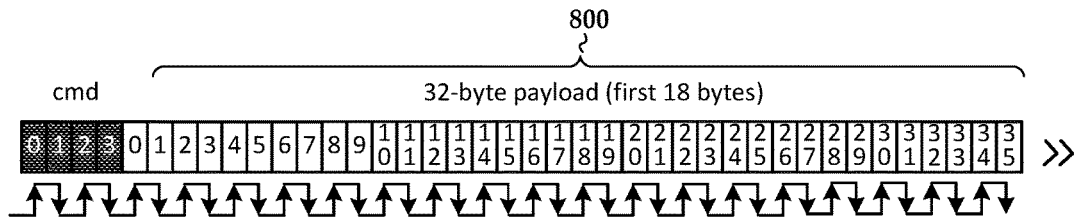
Figure 9:
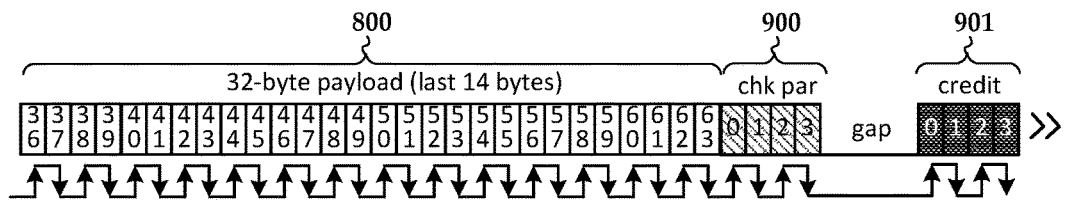
Figure 10:
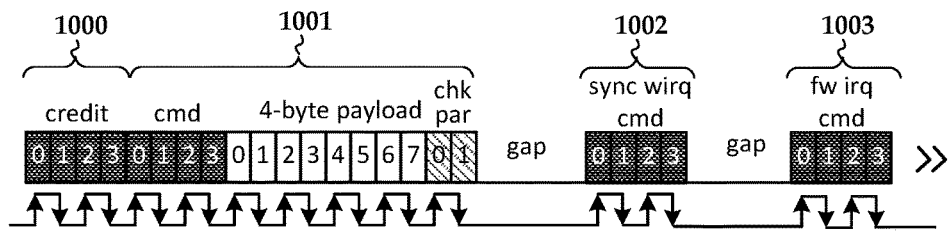

The sequence in FIG. 7 continues from FIG. 6 (without a clock gap therebetween) and illustrates a transfer with a 16-byte message payload 700. This time two clocks are required to transfer the payload parity check field 701. Note that only 10-bits of parity may be needed for SECDED protection of payload 700, however this is rounded up to 16-bits on the bus to avoid the parity field 701 from having an odd number of symbols. Recall that the LLP clock is low when idling (e.g., during gap 605) and therefore if all transmissions have even numbers of symbols (therefore being multiples of 8-bit bytes for a 4-bit bus), then the clock will always be low at the end of a message. The sequences in FIGS. 8 and 9 show a 32-byte transfer, the payload 800 being split between FIGS. 8 and 9. A 16-bit parity checksum 900 follows the payload 800. The parity checksum 900 is followed by a two clock credit command 901 which has no payload. Credits are issued by a one SOC to tell another SOC that the first SOC has resources available to receive messages. The examples above provide some perspective for the longest and shortest transactions times on LLP. In FIG. 10, additional messages 1000-1003 illustrate that there need be no restrictions on commands of any type or size being placed back-to-back or with intervening clock gaps.

In the previous examples, two SoCs were shown being coupled for purposes of exchanging servo data. With some modifications, this can be extended to more than two SoCs, e.g., N-SoCs, where N>2. Applying the LLP interface to support inter-servo communications in configurations of more than two SoCs can utilize one of a number of different connection topologies. In FIG. 11, a block diagram illustrates a one-to-many simplex topology according to an example embodiment. This example shows four (N=4) SoCs 1100-1103 coupled via four separate busses 1106-1109, although can be extended to any number SoCs. Each SoC 1100-1103 implements N−1 receive ports that connect to a single broadcast LLP output from each of the other N−1 SOCs. This topology preserves the unidirectional, arbitration-less attributes of the LLP, but is results in higher pin count, wiring congestion, and is not easily scalable.

In FIG. 12, a block diagram illustrates a shared bus topology according to an example embodiment. This example shows four (N=4) SoCs 1200-1203 coupled via a common, multiple-access bus 1206. This configuration allows for low pin count and simple wiring, but may introduce latency if arbitration is performed before a message is output to avoid collisions. This could impair the real-time nature of inter-servo communication, add protocol complexity, and electrical complexity (e.g., tri-state drivers). The shared-bus pin count advantage may also be reduced by the requisite addition of request and grant signals to implement arbitration. The command data header structures may also need to include some indicator of identity of sender (and possibly receiver), e.g., address, source ID.

Figure 13:
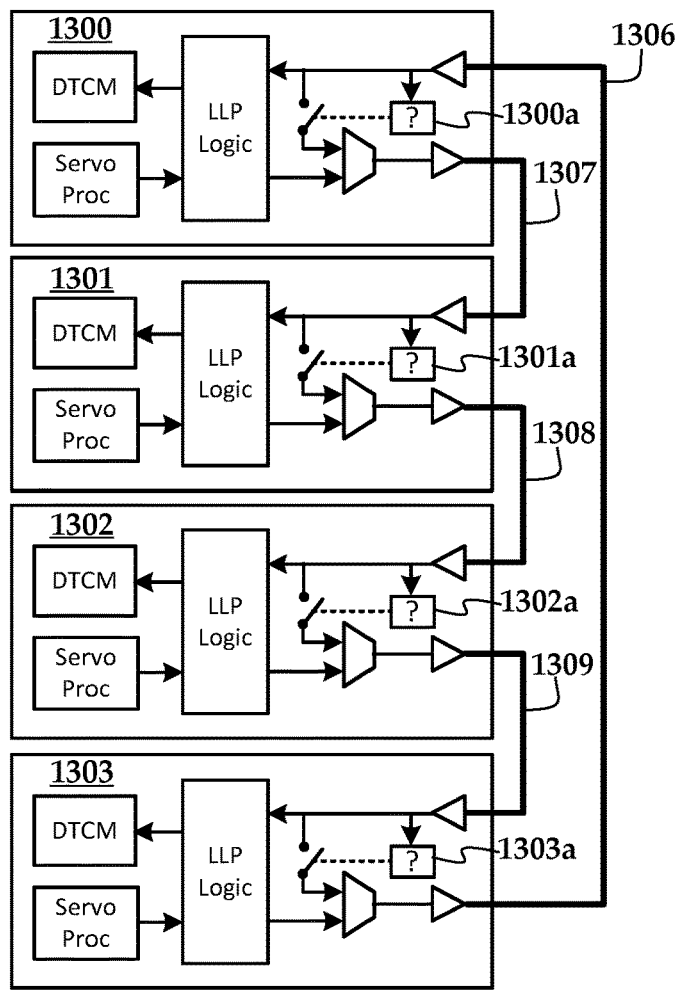
FIG. 13 is a block diagram illustrating a ring bus topology according to an example embodiment.

In FIG. 13, a block diagram illustrates a ring bus topology according to an example embodiment. This example shows four (N=4) SoCs 1300-1303 coupled via four, point-to-point common buses 1306-1309. The two-port structure (one in, one out) of the two-SoC configuration can be extended to N-SoC configurations supporting one-to-many broadcast messaging by wiring the buses into a ring topology, where any SoC can launch a message into the ring, which gets received and re-forwarded by all other SoCs in the ring. Each SoC 1300-1303 is shown with a source checker 1300a-1303a that controls whether a message is passed along to the respective bus 1306-1309.

This topology preserves the point-to-point electrical simplicity, SoC port count, and low-latency operation of the dual-SoC LLP configuration. Each SoC 1300-1303 in this configuration receives incoming messages from a prior SoC in the ring and simultaneously forwards them to the next SOC in the ring until the message arrives back at the originator, as identified by a source ID in each message. The originator can optionally input and error-check the reception of its own messages to confirm error-free reception by all other SoCs. In other embodiments, the last recipient in the ring before the sender can terminate further sending of the message. For example, if a message originated at SoC 1300 and was sent, in order, to SoCs 1301-1303, SoC 1303 can look at the source ID and not send the message back to SoC 1300. If it is desired that the originator 1300 at least verify that the message was successfully sent through the ring, the last SoC 1303 may send a shortened message, e.g., with a message ID and calculated checksum, that provides enough data to verify successful transmission without requiring the entire message be sent.

Although this topology doesn't require pre-transmit arbitration, the LLP ports may implement policies to avoid collisions of simultaneously-initiated message transmissions from different SoCs. One such policy is an "atomic-message" policy, wherein a complete message is sent on a link once any part of it has started transmission. Incoming messages arriving after an SoC has started its own message transmission are internally queued, e.g., in a first-in first-out (FIFO) queue, and sent to the next node after the local message transmission is done. When an SoC transmits a message into the ring, subsequent transmissions are not started until the current message has looped back to that SoC. In case of a tie, where the start of an incoming message is received just as an SOC is about to start transmission of its own message, the incoming message is forwarded and the local message transmission is held off.

Figure 14:
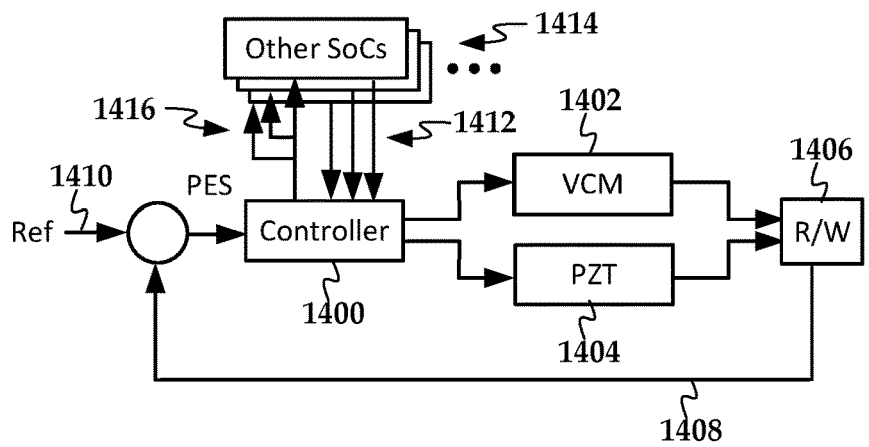
FIGS. 14 and 15 are block diagrams showing inter-controller servo compensation according to example embodiments.

While any type of message may be passed between servo controllers, e.g., status, synchronization, the LLP will largely be used for communicating information that can be used for servo compensation. This compensation can take a number of forms. In FIG. 14, a block diagram shows inter-SoC servo compensation according to an example embodiment. Generally, a controller 1400 provides outputs to a VCM 1402 that changes the location of a read/write head 1406. In this example, the head 1406 is driven by two-stage actuation, which includes a microactuator 1404 (e.g., piezoelectric actuator or PZT) that provides small displacement control of the head 1406 (e.g., during track following), the VCM 1402 being used for large displacements, (e.g., during track seek).

The read/write head 1406 generates a position signal 1408 based on reading servo marks recording onto the disk. This position signal 1408 is a feedback signal that is combined with a reference signal 1410 to produce a position error signal (PES) that is input to the controller 1400. The reference signal 1410 is input from the system controller (not shown) that indicates the desired placement of the read/write head 1406. Generally, the controller 1400 uses a model of the electrical and mechanical characteristics of the system to generate the appropriate inputs to the VCM 1402 and PZT 1404 that will minimize PES.

The servo controller 1400 works in a multi-controller and multi-actuator environment. As such information 1412 from other SoCs 1414 can be used to compensate for the mechanical and electrical effects of those actuators. In this example, the information 1412 is used as feedforward input to the controller 1400. This is similar to the use of vibration sensors to detect current disturbances acting on the head 1406. In this case, the information 1412 may be predictive, e.g., describing a command or action that another SoC 1414 is scheduled to perform, and so the controller 1400 may time shift the information so that compensation occurs at the correct time. The controller 1400 may apply other changes to the data, e.g., conversion of an action such as VCM acceleration/deceleration to an input via a system model. The controller 1400 also sends its own information 1416 to the other SoCs 1414, e.g., based on a queue of commands from the local system controller used to generate the reference signal 1410.

Figure 15:
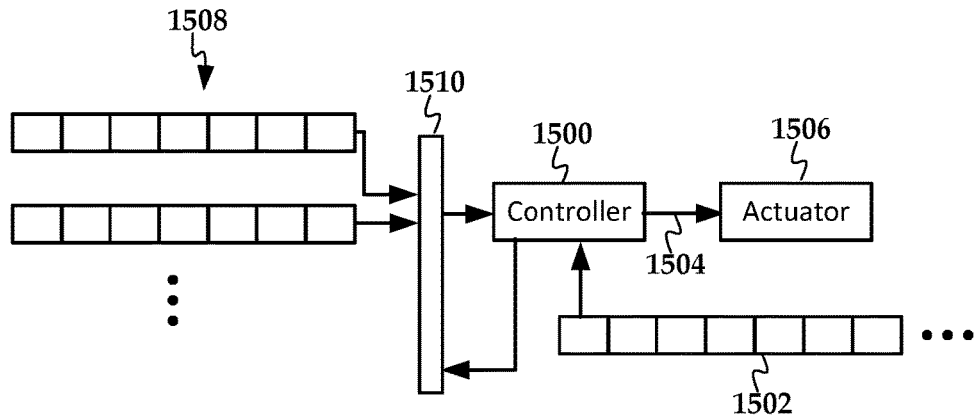

In FIG. 15, a block diagram shows inter-SoC servo compensation according to an example embodiment. A servo controller 1500 reads commands from a command queue 1502. The commands are translated into signals 1504 use to position an actuator 1506. Some of the commands (e.g., multiple track seek) may tend to cause disturbance elsewhere in the drive, while others of the commands (e.g., track following while writing) may be susceptible to disturbances generated elsewhere. Representations of command queues 1508 from other SoC controllers are communicated to the controller 1500 via an LLP interface 1510, and the controller also communicates a representation 1512 of its own command queue via the LLP interface 1510. The representation of the command queues may at least include a type and timing of future commands that are either susceptible to disturbance or that might cause disturbance. The illustrated controller 1500 (as well as the other controllers, not shown) can adjust timing of certain commands to minimize the chance of a disturbance event overlapping another event that is susceptible to disturbance.

Figure 16:
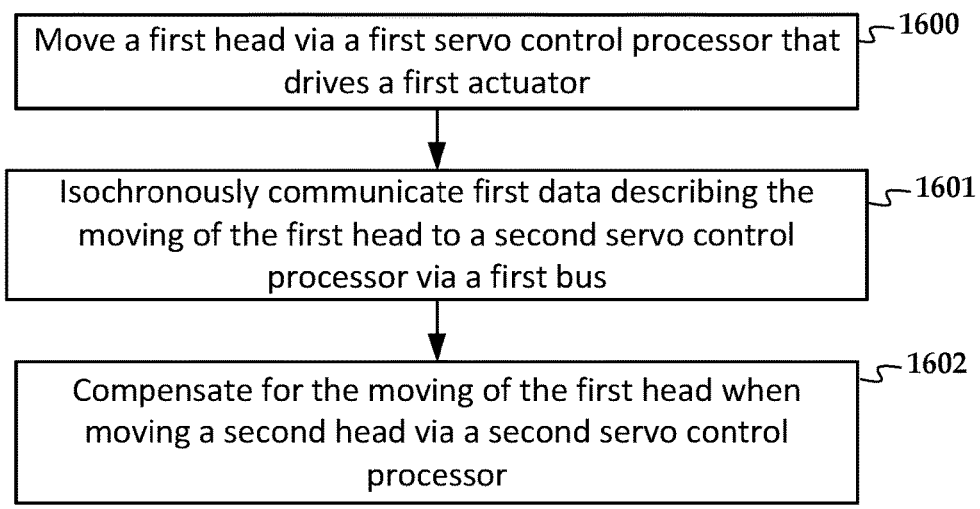
FIG. 16 is a flowchart of a method according to an example embodiment.

In FIG. 16, a flowchart shows a method according to an example embodiment. The method involves moving 1600 a first head over one or more disks of a data storage drive via a first servo control processor that drives a first actuator that moves the first head. First data describing the moving of the first head is isochronously communicated 1601 to a second servo control processor via a first bus that couples respective first and second low-latency ports of the first and second servo control processors. The second servo control processor drives a second actuator that moves a second head. Responsive to receiving the first data at the second servo control processor, the moving of the first head is compensated for 1602 when moving the second head over the one or more disks via the second servo control processor. The second head is moved independently of the movement of the first head.

The various embodiments described above may be implemented using circuitry, firmware, and/or software modules that interact to provide particular results. One having skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A data storage drive, comprising:
   first and second servo control processors coupled to respective first and second actuators that independently position first and second heads over one or more disks of the data storage drive, the first and second servo control processors further coupled to first and second low-latency ports; and
   first and second unidirectional buses coupling the first and second low-latency ports, the first and second unidirectional busses operable to isochronously exchange servo positioning data between the first and second servo control processors, the first and second servo control processors each using the servo positioning data to compensate for movement caused by another of the first and second servo control processors.

2. The data storage drive of claim 1, wherein the first and second unidirectional buses comprise four-bit busses.

3. The data storage drive of claim 1, wherein the first and second unidirectional buses are clocked an order of magnitude higher than sample rates of the first and second servo control processors.

4. The data storage drive of claim 1, wherein the first and second unidirectional buses utilize burst clocking, such that first and second clocks of the first and second low-latency ports are active only when data is sent on the respective first and second unidirectional buses.

5. The data storage drive of claim 4, wherein messages sent via the first and second unidirectional buses are multiples of twice a bit width of the first and second unidirectional buses, thereby resulting in the first and second clocks being low after transmitting a last bit of the messages.

6. The data storage drive of claim 1, further comprising:
   a third servo control processor coupled to a third actuator that independently positions a third head over the one or more disks; and
   a third unidirectional bus coupling the third servo control processor to the first and second servo control processor, the first unidirectional bus coupling the first servo control processor to the second and third servo control processors, and the second unidirectional bus coupling the second servo control processor to the first and third servo control processors.

7. The data storage device of claim 1, further comprising first and second tightly-coupled memory coupled to receive incoming data of the first and second low-latency ports.

8. The data storage device of claim 1, wherein the first and second servo control processors are operable to perform an initialization handshake that synchronizes framing of messages on the first and second unidirectional buses.

9. The data storage device of claim 1, wherein the first and second servo control processors are configured to communicate back-to-back messages of different sizes on the first and second unidirectional buses.

10. A method, comprising:
moving a first head over one or more disks of a data storage drive via a first servo control processor that drives a first actuator that moves the first head;
isochronously communicating first data describing the moving of the first head to a second servo control processor via a first bus that couples respective first and second low-latency ports of the first and second servo control processors, the second servo control processor driving a second actuator that moves a second head; and
responsive to receiving the first data at the second servo control processor, compensating for the moving of the first head when moving the second head over the one or more disks via the second servo control processor, the second head moved independently of the first head.

11. The method of claim 10, further comprising:
isochronously communicating second data describing the moving of the second head to the first servo control processor via a second bus that couples the respective first and second low-latency ports; and
responsive receiving the second data, compensating for the positioning of the second head when further moving the first head over the one or more disks via the first servo control processor.

12. The method of claim 10, further comprising:
isochronously communicating second data describing the moving of the second head to the first servo control processor via the first bus; and
responsive receiving the data, compensating for the positioning of the second head when further moving the first head over the one or more disks via the first servo control processor.

13. The method of claim 12, further comprising:
isochronously communicating the first and second data to one or more additional servo control processors via the first bus; and
responsive receiving the first and second data, compensating for the positioning of one or more additional heads via the one or more additional servo control processor.

14. The method of claim 10, further comprising:
responsive to receiving the first data, isochronously communicating the first data to a third servo control processor via a second bus that couples the second low-latency port with a third low-latency port of the third servo control processor, the third servo control processor driving a third actuator that moves a third head; and
responsive to receiving the first data at the third servo control processor, compensating for the moving of the first head when moving the third head over the one or more disks via the third servo control processor, the third head moved independently of the movements of the first and second heads.

15. The method of claim 14, wherein the first, second, and third servo control processors are coupled by at least one more bus that forms a ring topology so that the third servo processor can isochronously communicate servo data to the first servo processor.

16. The method of claim 10, wherein the first bus is kept at a low clock state when data is not being transmitted to the second servo control processor, the bus being clocked an order of magnitude higher than sample rates of the first and second servo control processors.

17. An apparatus, comprising:
first and second heads operable to access one or more disks;
first and second actuators that independently position the first and second heads over the one or more disks;
first and second systems on a chip, comprising:
respective first and second servo control processors coupled to the respective first and second actuators, at least one of the first and second servo control processors operating at a maximum servo sampling rate; and
respective first and second low-latency ports coupled to the respective first and second servo control processors; and
at least one bus coupling the first and second low-latency ports, the at least one bus operating at a frequency orders of magnitude higher that the maximum servo sampling rate resulting in low utilization of the at least one bus, the first and second servo control processors exchanging servo positioning data via the at least one bus and using the servo positioning data to compensate for movement caused by another of the first and second servo control processors.

18. The apparatus of claim 17, wherein the at least one bus comprises first and second unidirectional buses.

19. The apparatus of claim 18, wherein the first and second unidirectional buses are four-bit busses.

20. The apparatus of claim 17, further comprising:
a third head operable to access the one or more disks;
a third actuator that positions the third head over the one or more disks independently of the first and second heads; and
a third system on a chip comprising:
a third servo control processor coupled to the third actuator; and
a third low-latency port coupled to the third servo control processor and the at least one bus, the third servo processor exchanging additional servo positioning data with the first and second servo control processors data via the at least one bus.

* * * * *